Nov. 6, 1962   W. Q. ADAMS ET AL   3,062,413

HOME FREEZER CONTAINER FILLER DEVICE

Filed June 20, 1960

INVENTORS
WILLIAM Q. ADAMS
MACK J. PULLEN
BY
Gustave Miller
ATTORNEY

United States Patent Office 3,062,413
Patented Nov. 6, 1962

3,062,413
HOME FREEZER CONTAINER FILLER DEVICE
William Q. Adams, De Ridder, La. (Box 101, Newton, Tex.), and Mack J. Pullen, Rte. 1, Box 237B, Jasper, Tex.
Filed June 20, 1960, Ser. No. 37,310
1 Claim. (Cl. 222—185)

This invention relates to a filling device, and it particularly relates to a filling device for filling home freezer containers or the like.

Almost any type food can be kept in fresh condition by quick freezing and home freezers are today present in the majority of homes in the nation, the freezers being either separate lockers or cabinets or integral parts of refrigerators.

Among the many foods which lend themselves to ready freezing are snap beans, shell beans, peas, other such vegetables and various types of fruits which are precooked prior to freezing.

Heretofore, the general method of filling containers for home freezers was to take the items from a blanching or cooking pot, place them on a table or cabinet top to drain off the excess water and then cool. Thereafter, it was necessary to scoop up the items by hand or with a spoon, cup or similar utensil and pour them into a freezer container usually made of polyethylene or the like. However, during this filling process, the food was often bruised or mashed. Furthermore, it was difficult to control the filling so that the container was either not sufficiently filled or the food overflowed the sides. In addition, when scooping up the food items, the cooking or heating liquids would also be scooped up and it was most difficult to drain this liquid without using a separate strainer or the like. In general, it was quite a messy operation requiring much cleaning up after it was over and, in addition, it was not overly sanitary because it was almost always necessary to touch the food with the hands.

It is one object of the present invention to overcome the aforesaid disadvantages by providing a filling device which does not bruise or mash the food being processed and which easily fills the container to an exactly desired level.

Another object of the present invention is to provide a filling device of the aforesaid type which permits complete drainage of liquids at the same time that the filling is taking place.

Another object of the present invention is to provide a filling device of the aforesaid type which readily accomplishes its purpose while avoiding any mess or undue disturbance of the kitchen.

Other objects of the present invention are to provide an improved filling device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
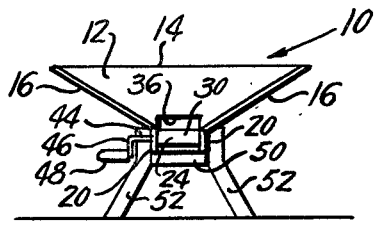
FIG. 1 is an end elevational view of a filling device embodying the present invention.
Figure 3:
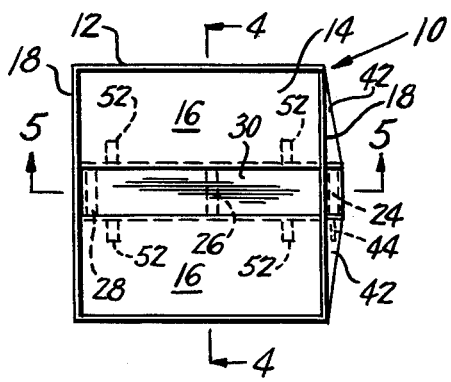
FIG. 3 is a top plan view of the device of FIGS. 1 and 2.
Figure 4:
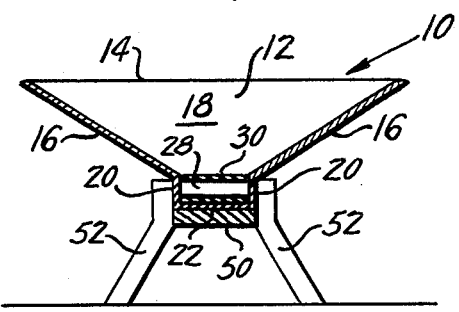
FIG. 4 is a cross-sectional view taken on line 4—4 of FIG. 3.

Referring in greater detail to the drawing wherein similar reference characters refer to similar parts, there is shown a filling device, generally designated 10, comprising a housing 12 of generally rectangular shape (as best seen in FIG. 3) and of funnel or trough shape when viewed endwise or in section (as in FIGS. 1 and 4).

The housing 12 is defined by an open top 14 and by oppositely inwardly-inclined side walls 16 and end walls 18. The side walls 16 are integral at their lower ends with straight vertical walls 20 which are, in turn integral with a bottom strip 22, the walls 20 and strip 22 defining a channel in which is positioned a belt conveyor. The belt conveyor comprises a plurality of rollers preferably of wood or plastic indicated at 24, 26 and 28 over which runs an endless belt 30, preferably constructed of rubber.

The rollers 26 and 28 are positioned within the channel at the bottom of the housing 12 and are mounted on axles of metal or plastic, respectively indicated at 32 and 34, which are releasably journaled in vertical slots in the opposite side walls 20. However, the roller 24 is positioned outside the channel at the bottom of housing 12 and the belt 30 passes thereover after passing through an aperture 36 in the corresponding end wall 18. The roller 24 is mounted on an axle 38 which is releasably journaled in corresponding slots in oppositely positioned bearing portions 40 each of which is integral with an inclined housing wall extension 42.

The axle 38 is provided with an extension 44 on which is formed a crank arm 46. The crank arm 46 is provided with a handle 48.

The housing 12 is mounted on a platform 50 which is supported by legs 52. In this manner, the housing 12 is positioned sufficiently elevated to permit a freezer container 54 to be positioned just below the end of the conveyor compressing roller 24.

Figure 2:
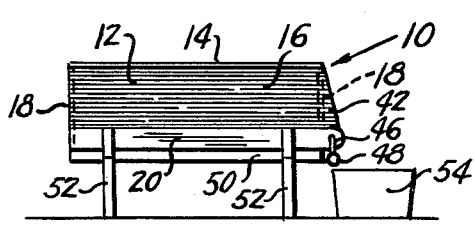
FIG. 2 is a side elevational view of the device of FIG. 1 viewed from the left side of FIG. 1.
Figure 5:
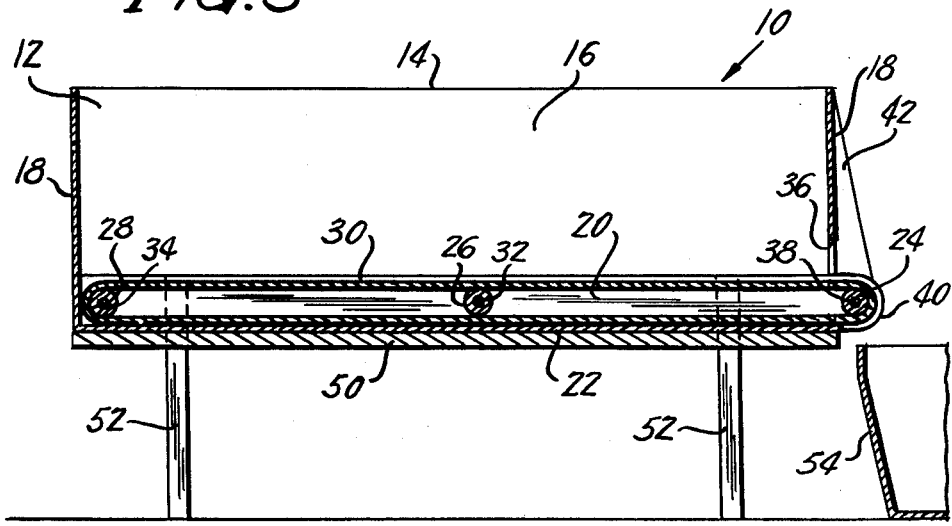
FIG. 5 is a longitudinal sectional view, greatly enlarged, as taken on line 5—5 of FIG. 3.

In operation, the food items are placed in the housing 12 and the container 54 is placed under the outer end of the conveyor projecting out of the housing 12 (as shown in FIGS. 2 and 5). Then the handle 48 is manipulated to move the conveyor belt 30 by rotating the roller 24. The belt 30 moves the food particles through the apertures 36 and drops them off into the container 54 as the belt 30 moves around roller 24. During this conveying period, all liquids are substantially drained off either while the food is on the conveyor within the housing 12 or as it falls from the conveyor belt 30 into the container 54.

The amount of food which is conveyed into the container 54 is accurately determined because as soon as the container 54 appears to be completely filled, the handle 48 is stopped from turning and the conveyor immediately stops delivering food to the container 54. The top can then be placed on the container 54 which is then ready for the freezer. Throughout this operation, it is never necessary to touch the food with the hands despite the adequate measurement thereof as delivered to the container 54.

If desired, the conveyor belt 30 can be made porous or of mesh type material to aid in drainage of the liquid. The channel at the bottom of housing 12 may also be made deeper to accommodate more drainage liquid and, if desired, a drain opening may be provided to remove the excess liquid.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A home freezer container filling device comprising, in its entirety, a relatively flat platform mounted on a plurality of outwardly flaring supporting legs, a housing arranged to be supported on said platform, said housing having an open top, inwardly inclined downwardly extending side walls tapered forwardly and downwardly at their front ends, front and back vertical end walls, a longitudinally extending bottom channel member comprising a flat bottom wall and vertically extending opposite side walls having corresponding vertically extending slots, said inclined side walls being fixedly connected to the top edges of said vertical walls of said channel member, said vertical back wall being connected to the back ends of said inclined side walls of said housing and to the back ends of said channel member bottom and vertical side walls, said vertical front wall having an opening over said channel member, said channel member extending forwardly through and beyond said opening, said vertical front wall being connected to said inclined side walls slightly rearwardly of their tapered front ends, and a conveyor in said channel member, said conveyor comprising an endless belt and a plurality of rollers, each said roller being mounted on an axle releasably journaled in said corresponding vertically extending slots facilitating the vertical removal of said conveyor, one of said rollers being closely adjacent said vertical back wall, another of said rollers being located forwardly of said vertical front wall, and a crank handle operatively connected to said forwardly located roller outside said housing for feeding said belt over said rollers along said channel member.

References Cited in the file of this patent

UNITED STATES PATENTS

| | | |
|---|---|---|
| 219,911 | Clark et al. | Sept. 23, 1879 |
| 1,360,422 | Lyon | Nov. 30, 1920 |